United States Patent
Iwano

(10) Patent No.: US 6,313,933 B1
(45) Date of Patent: Nov. 6, 2001

(54) BIDIRECTIONAL WAVELENGTH DIVISION MULTIPLEX TRANSMISSION APPARATUS

(75) Inventor: Tadayuki Iwano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/034,312

(22) Filed: Mar. 4, 1998

(30) Foreign Application Priority Data

May 15, 1997 (JP) .................................................. 9-125644

(51) Int. Cl.⁷ .................................................. H04J 14/02
(52) U.S. Cl. .................................................. 359/130; 359/124
(58) Field of Search .................................... 359/124, 127, 359/130, 174, 179, 143, 154

(56) References Cited

U.S. PATENT DOCUMENTS

| | | | |
|---|---|---|---|
| 5,652,675 | * 7/1997 | Shibuya | 359/341 |
| 5,689,594 | * 11/1997 | Mao | 359/24 |
| 5,748,350 | * 5/1998 | Pan et al. | 359/130 |
| 5,812,306 | * 9/1998 | Mizrahi | 359/341 |
| 5,978,131 | * 11/1999 | Lauzon et al. | 359/341 |

FOREIGN PATENT DOCUMENTS

| | | |
|---|---|---|
| 6-342952 | 12/1994 | (JP) . |
| 7-212316 | 8/1995 | (JP) . |
| 8-163028 | 6/1996 | (JP) . |

OTHER PUBLICATIONS

Japanese Office Action, dated May 16, 2000, with English Language translation of Japanese Examiner's comments.

* cited by examiner

*Primary Examiner*—Jason Chan
*Assistant Examiner*—Christina Y Leung
(74) *Attorney, Agent, or Firm*—McGuireWoods LLP

(57) ABSTRACT

A bidirectional wavelength division multiplex transmission apparatus includes first and second optical circulators, an optical amplifier, and a demultiplexing unit. The first optical circulator is connected to a first optical transmission line to branch/insert reverse and forward wavelength division multiplex optical signals having different wavelengths. The second optical circulator is connected to a second optical transmission line to branch/insert reverse and forward wavelength division multiplex optical signals having different wavelengths. The multiplexer performs wavelength division multiplexing of the signals from the optical circulators. The optical amplifier amplifies the optical signal output from the multiplexer. The demultiplexing unit demultiplexes the optical signal amplified by the optical amplifier on the basis of the wavelengths, and outputs the demultiplexed optical signal to one of the first and second optical transmission lines. The demultiplexing unit includes an optical demultiplexer for demultiplexing the optical signal from the amplifier into two optical signals, and optical filters for allowing optical signals, of the demultiplexed optical signals, which have specific wavelengths to pass therethrough, and outputting the signals to one of the first and second circulators.

18 Claims, 8 Drawing Sheets

BIDIRECTIONAL WAVELENGTH DIVISION MULTIPLEX TRANSMISSION APPARATUS

BACKGROUND OF THE INVENTION

The present invention relates to a bidirectional wavelength division multiplex transmission apparatus using a wavelength division multiplex optical amplifier.

FIG. 7 shows the first example of the conventional bidirectional transmission apparatus using the bidirectional wavelength division multiplex optical amplifier. As shown in FIG. 7, this apparatus uses WDM (Wavelength Division Multiplex) couplers 21 to 23 as optical branching/inserting means for signal light beams to be transmitted bidirectionally. Reference numeral 2 denotes an optical multiplexer; and 3, a wavelength division multiplex transmission optical amplifier.

FIG. 8 shows the second example of the apparatus using the bidirectional wavelength division multiplex optical amplifier. As shown in FIG. 8, this apparatus uses optical circulators 31 and 32 to make only the optical transmission lines bidirectional. The apparatus amplifies branched wavelength division multiplex signals by using wavelength division multiplex transmission amplifiers 41 and 42 separately used for reverse and forward links.

In the apparatus as the first example using the WDM couplers, the respective wavelengths must be spaced apart from each other by at least about 10 nm, as indicated by the wavelength transmission range characteristics in FIG. 9. For this reason, the number of wavelengths which can be multiplexed is limited, and optical transmission lines for transmitting optical signals cannot be effectively used.

The apparatus as the second example, which makes only the optical transmission lines bidirectional, requires two optical amplifiers. This increases the cost of the apparatus and degrades maintainability.

SUMMARY OF THE INVENTION

It is an object of the present invention to provide a bidirectional wavelength division multiplex transmission apparatus which effectively uses optical transmission lines.

It is another object of the present invention to provide a bidirectional wavelength division multiplex transmission apparatus which prevents an increase in apparatus cost and degradation in maintainability.

In order to achieve the above objects, according to the present invention, there is provided a bidirectional wavelength division multiplex transmission apparatus comprising first optical branching/inserting means, connected to a first optical transmission line through which reverse and forward wavelength division multiplex optical signals having different wavelengths are transmitted, for branching/inserting the optical signals, second optical branching/inserting means, connected to a second optical transmission line through which reverse and forward wavelength division multiplex optical signals having different wavelengths are transmitted, for branching/inserting the optical signals, multiplexing means for performing wavelength division multiplexing of the optical signals output from the first and second branching/inserting means, an optical amplifier for amplifying the wavelength division multiplex optical signal output from said multiplexing means, and demultiplexing means for demultiplexing the wavelength division multiplex optical signal amplified by the optical amplifier on the basis of the wavelengths, and outputting the demultiplexed optical signal to one of the first and second optical transmission lines which corresponds to a propagating direction, the demultiplexing means being constituted by an optical demultiplexer for demultiplexing the optical signal from the optical amplifier into two optical signals, and optical filters for allowing optical signals, of the demultiplexed optical signals, which have specific wavelengths to pass therethrough, and outputting the signals to one of the first and second optical branching/inserting means which corresponds to the propagating direction.

DESCRIPTION OF THE PREFERRED EMBODIMENTS

The present invention will be described in detail below with reference to the accompanying drawings.

Figure 1:
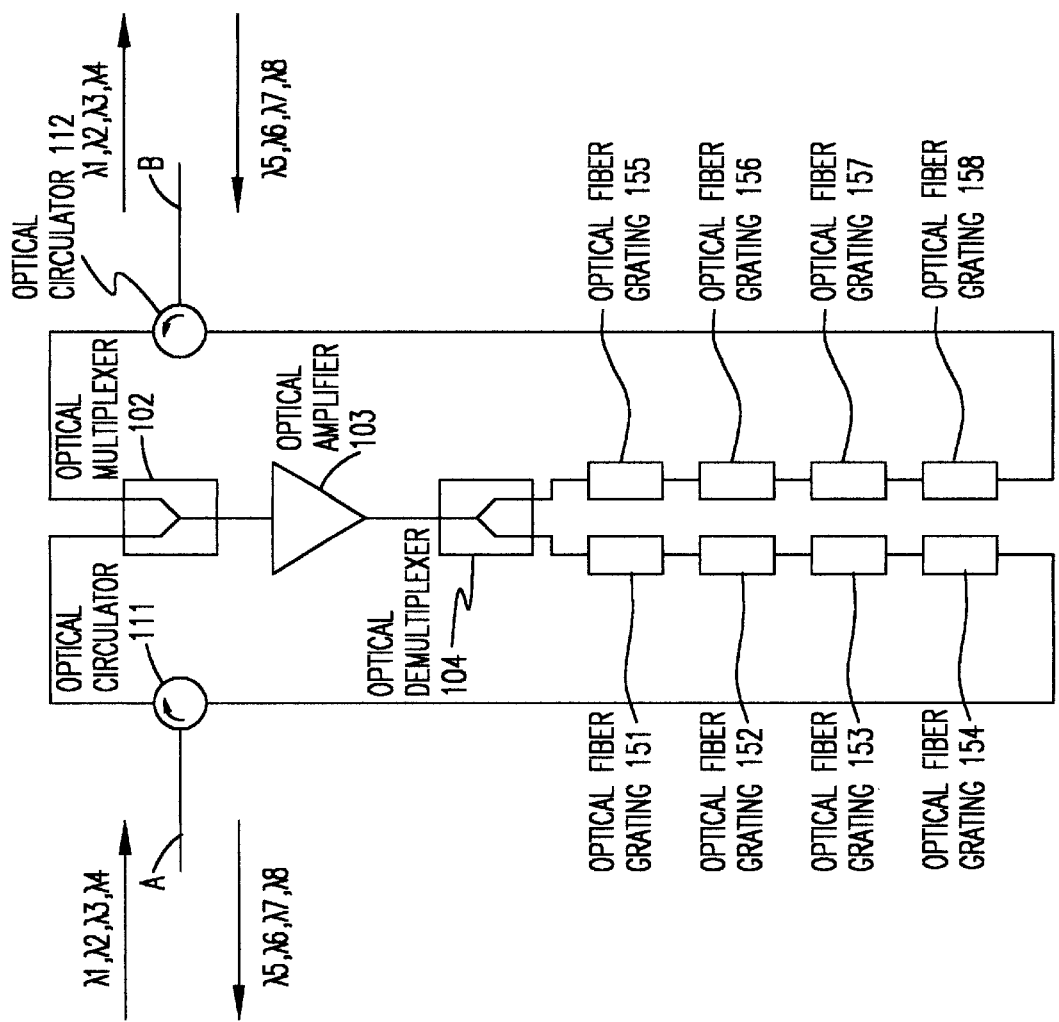
FIG. 1 is a block diagram showing a bidirectional wavelength division multiplex transmission apparatus according to the first embodiment of the present invention.

FIG. 1 shows a bidirectional wavelength division multiplex transmission apparatus according to the first embodiment of the present invention. Referring to FIG. 1, the apparatus of this embodiment is constituted by an optical multiplexer 102 for multiplexing two optical signals input to the first and second input terminals, a wavelength division multiplex transmission amplifier 103 for amplifying an output from the optical multiplexer 102, an optical demultiplexer 104 for demultiplexing an output from the wavelength division multiplex transmission amplifier 103 into two signals, a plurality of optical fiber gratings 151 to 154 which receive one output from the optical demultiplexer 104 and respectively have reflection characteristics corresponding to wavelengths $\lambda1$ to $\lambda4$, a plurality of optical fiber gratings 155 to 158 which receive the outer output from the optical demultiplexer 104 and respectively have reflection characteristics corresponding to wavelengths $\lambda5$ to $\lambda8$, an optical circulator 111 having three ports to which the output terminal of the optical fiber grating 154, the first input terminal of the optical multiplexer 102, and an optical transmission line A are respectively connected, and an optical circulator 112 having three ports to which the output terminal of the optical fiber grating 158, the second input terminal of the optical multiplexer 102, and an optical transmission line B are respectively connected.

The input ports of the optical circulators 111 and 112 are connected to the output terminals of the optical fiber gratings 154 and 158. The output ports of the optical circulators 111 and 112 are connected to the first and second input terminals of the optical multiplexer 102. The input/output ports of the optical circulators 111 and 112 are respectively connected to the optical transmission lines A and B. The optical transmission lines A and B are constituted by optical fibers.

The operation of the bidirectional wavelength division multiplex transmission apparatus having the above arrangement will be described next. Assume that the wavelengths of wavelength division multiplex signal light beams transmitted through the optical transmission line A are respectively represented by $\lambda 1$ to $\lambda 4$, and those of wavelength division multiplex light beams transmitted through the optical transmission line B are respectively represented by $\lambda 5$ to $\lambda 8$. The wavelength division multiplex signal light beams having the wavelengths $\lambda 1$ to $\lambda 4$ transmitted through the optical transmission line A are input to the first input terminal of the optical multiplexer 102 through the optical circulator 111. The wavelength division multiplex signal light beams having the wavelengths $\lambda 5$ to $\lambda 8$ transmitted through the optical transmission line B are input to the second input terminal of the optical multiplexer 102 through the optical circulator 112. The optical multiplexer 102 multiplexes the two input optical signals to output a wavelength division multiplex signal light beam having the wavelengths $\lambda 1$ to $\lambda 8$. The wavelength division multiplex signal light beam having the wavelengths $\lambda 1$ to $\lambda 8$ output from the optical multiplexer 102 is amplified by the wavelength division multiplex transmission amplifier 103 altogether. The optical demultiplexer 104 and optical fiber gratings 151 to 154 and 155 to 158 send the amplified wavelength division multiplex signal light beam to the optical transmission line B on the opposite side (transmission side) to the optical transmission line A side (transmission side).

The optical fiber gratings 151 to 154 and 155 to 158 select wavelengths corresponding to the optical transmission line on the transmission side from the wavelength division multiplex signal light beam demultiplexed by the optical demultiplexer 104, thereby extracting a wavelength division multiplex signal light beam. With this operation, the wavelength division multiplex signal light beam extracted by the optical fiber gratings 155 to 158 is sent to the optical transmission line B through the optical circulator 112.

Selection of wavelengths from a wavelength division multiplex signal light beam will be described in detail next. The wavelength division multiplex signal light beam having the wavelengths $\lambda 1$ to $\lambda 8$ output from the wavelength division multiplex transmission amplifier 103 is demultiplexed into two signal light beams by the optical demultiplexer 104. The wavelengths to be sent to the optical transmission lines A and B are selected from the two wavelength division multiplex signal light beams by using the optical filter characteristics of the optical fiber gratings 151 to 158.

More specifically, the wavelength division multiplex signal light beam having the wavelengths $\lambda 1$ to $\lambda 4$ from the optical transmission line A is demultiplexed into two signal light beams by the optical demultiplexer 104 to be input to the optical fiber gratings 151 to 154 and the optical fiber gratings 155 to 158. The optical fiber gratings 155 to 158 have reflection characteristics corresponding to the wavelengths $\lambda 5$ to $\lambda 8$, and hence transmit the wavelength division multiplex signal light beam having the wavelengths $\lambda 1$ to $\lambda 4$ from the optical transmission line A. Since the optical fiber gratings 151 to 154 have reflection characteristics corresponding to the wavelengths $\lambda 1$ to $\lambda 4$, the wavelength division multiplex signal light beam having the wavelengths $\lambda 1$ to $\lambda 4$ from the optical transmission line A is reflected by each of the optical fiber gratings 151 to 154. As a result, the transmission of the signal light beam is blocked. With this operation, the wavelength division multiplex signal light beam having the wavelengths $\lambda 1$ to $\lambda 4$ selected/extracted by the optical fiber gratings 155 to 158 is sent to the optical transmission line B through the optical circulator 112.

The wavelength division multiplex signal light beam from the optical transmission line B is demultiplexed into two signal light beams by the optical demultiplexer 104. The two signal light beams are input to the optical fiber gratings 151 to 154 and the optical fiber gratings 155 to 158. The optical fiber gratings 151 to 154 have reflection characteristics corresponding to the wavelengths $\lambda 1$ to $\lambda 4$, and hence transmit the wavelength division multiplex signal light beam having the wavelengths $\lambda 5$ to $\lambda 8$ from the optical transmission line B. Since the optical fiber gratings 155 to 158 have reflection characteristics corresponding to the wavelengths $\lambda 5$ to $\lambda 8$, the wavelength division multiplex signal light beam having the wavelengths $\lambda 5$ to $\lambda 8$ from the optical transmission line B is reflected by each of the optical fiber gratings 155 to 158. As a result, the transmission of this signal light beam is blocked.

A bidirectional wavelength division multiplex transmission apparatus according to the second embodiment of the present invention will be described next with reference to FIG. 2.

Figure 2:
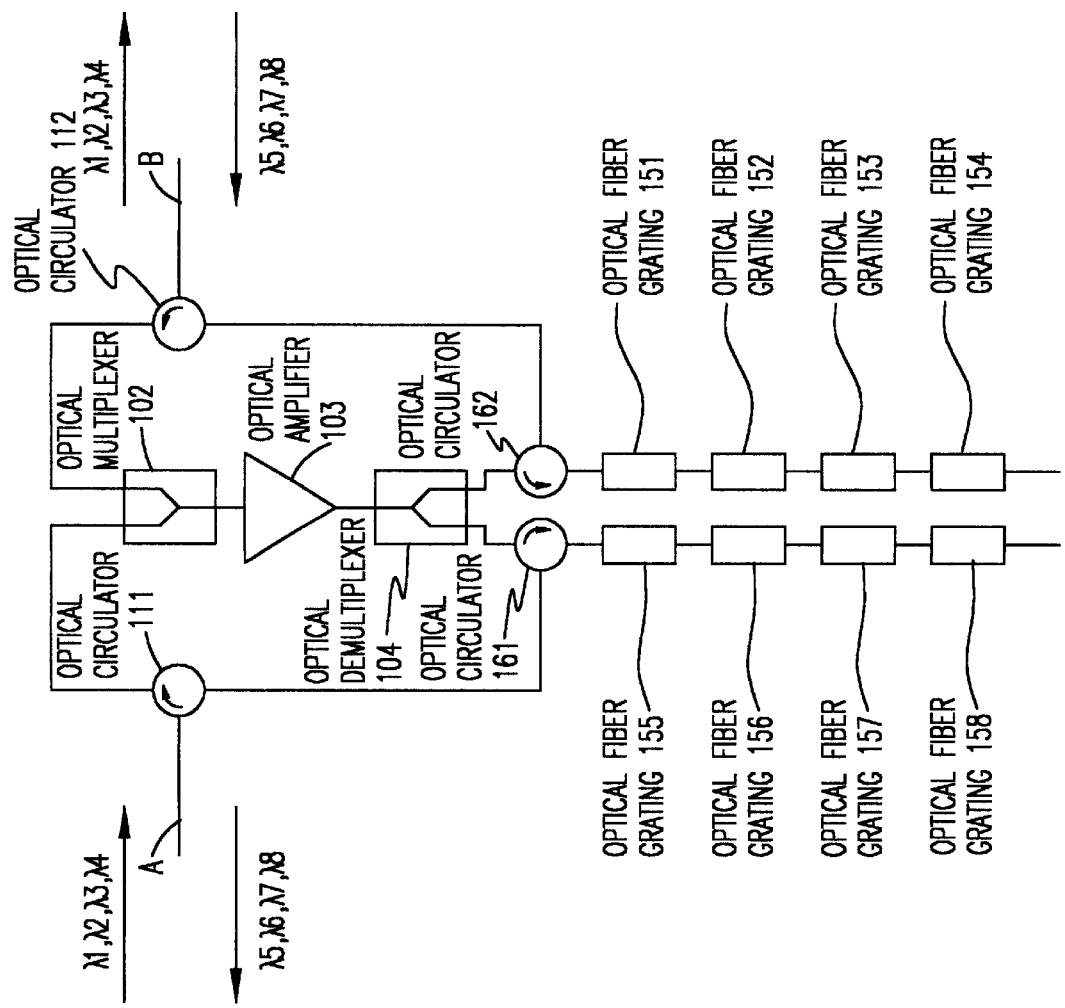
FIG. 2 is a block diagram showing a bidirectional wavelength division multiplex transmission apparatus according to the second embodiment of the present invention.

Referring to FIG. 2, optical circulators 161 and 162, each having three ports, are connected between the two output terminals of an optical demultiplexer 104 and optical fiber gratings 155 and 151. The input port of the optical circulator 161 is connected to the first output terminal of the optical demultiplexer 104. The output port of the optical circulator 161 is connected to the input port of an optical circulator 111. The input/output port of the optical demultiplexer 104 is connected to the input terminal of the optical fiber grating 155. The input port of the optical circulator 162 is connected to the second output terminal of the optical demultiplexer 104. The output port of the optical circulator 162 is connected to the input port of an optical circulator 112. The input/output port of the optical circulator 162 is connected to the input terminal of the optical fiber grating 151.

In this arrangement, wavelength division multiplex signal light having wavelengths $\lambda 1$ to $\lambda 4$ from an optical transmission line A is demultiplexed into two signal light beams by the optical demultiplexer 104. The two signal light beams are respectively input to a group of optical fiber gratings 151 to 154 and a group of optical fiber gratings 155 to 158 through the optical circulators 161 and 162. The optical fiber gratings 151 to 154 respectively have reflection characteristics corresponding to the wavelengths $\lambda 1$ to $\lambda 4$, and hence reflect only the wavelength division multiplex signal light having the wavelengths $\lambda 1$ to $\lambda 4$. In this case, the optical fiber gratings 151 to 154 are processed to have reflectionless terminations so as to prevent signal light beams other than those having the wavelengths $\lambda 1$ to $\lambda 4$ from returning as reflected light beams. The wavelength division multiplex signal light having the wavelengths $\lambda 1$ to $\lambda 4$ reflected by the optical fiber gratings 151 to 154 is input to the optical circulator 162 and sent to an optical transmission line B through the optical circulator 112.

Since the optical fiber gratings 155 to 158 have reflection characteristics corresponding to wavelengths λ5 to λ8, the wavelength division multiplex signal light having the wavelengths λ1 to λ4 branched from the optical transmission line A passes through these gratings without being reflected.

The wavelength division multiplex signal light having λ5 to λ8 from the optical transmission line B is demultiplexed into two signal light beams by the optical demultiplexer 104. The two signal light beams are respectively input to the group of the optical fiber gratings 151 to 154 and the group of the optical fiber gratings 155 to 158 through the optical circulators 161 and 162. The optical fiber gratings 155 to 158 respectively have reflection characteristics corresponding to the wavelengths λ5 to λ8, and hence reflect only the wavelength division multiplex signal light having the wavelengths λ5 to λ8 from the optical transmission line B. In this case, the optical fiber gratings 155 to 158 are processed to have reflectionless terminations so as to prevent signal light beams other than those having the wavelengths λ5 to λ8 from returning as reflected light beams. The wavelength division multiplex signal light having the wavelengths λ5 to λ8 reflected by the optical fiber gratings 155 to 158 is input to the optical circulator 161 and sent to the optical transmission line A through the optical circulator 111.

Since the optical fiber gratings 151 to 154 respectively have reflection characteristics corresponding to the wavelengths λ1 to λ4, the wavelength division multiplex signal light having the wavelengths λ5 to λ8 from the optical transmission line B passes through these gratings without being reflected.

A bidirectional wavelength division multiplex transmission apparatus according to the third embodiment of the present invention will be described next with reference to FIG. 3.

Figure 3:
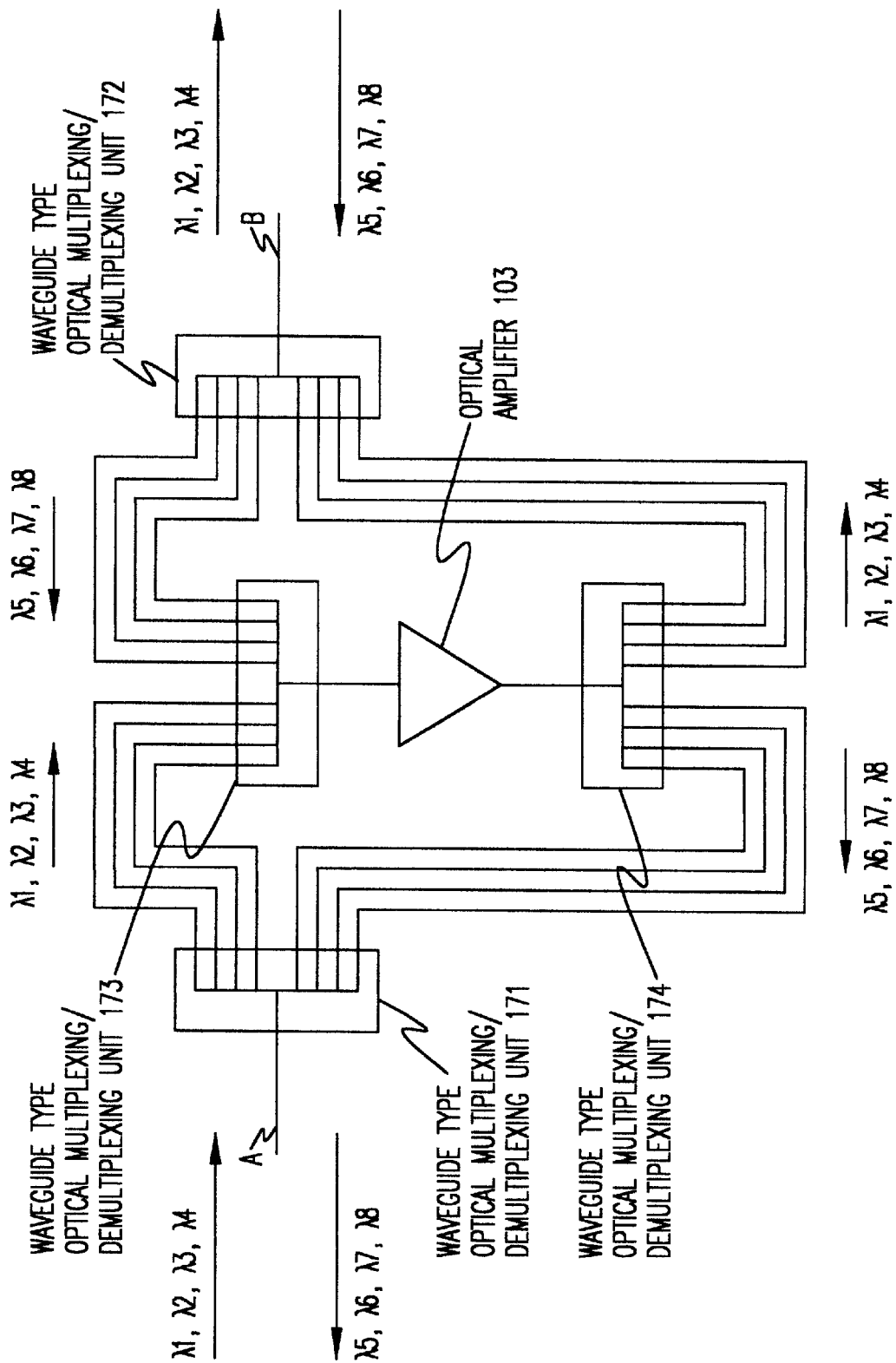
FIG. 3 is a block diagram showing a bidirectional wavelength division multiplex transmission apparatus according to the third embodiment of the present invention.

Referring to FIG. 3, waveguide type optical multiplexing/demultiplexing units 171, 172, and 173 are used in place of the optical circulators 111 and 112 and the optical multiplexer 102 in FIG. 1, and a waveguide type optical multiplexing/demultiplexing unit 174 is used in place of the optical demultiplexer 104 and the optical fiber gratings 155 to 158. The waveguide type optical multiplexing/demultiplexing units 171, 172, 173, and 174 process the wavelengths of optical signals constituting wavelength division multiplex signal light.

The waveguide type optical multiplexing/demultiplexing units 171 and 172 respectively demultiplex wavelength division multiplex signal light having wavelengths λ1 to λ4 and wavelength division multiplex signal light having wavelengths λ5 to λ8 from optical transmission lines A and B in units of wavelengths, and output the resultant signal light beams to the waveguide type optical multiplexing/demultiplexing unit 173. The waveguide type optical multiplexing/demultiplexing unit 173 multiplexes the wavelength division multiplex signal light having the wavelengths λ1 to λ4 and the wavelength division multiplex signal light having the wavelengths λ5 to λ8, and outputs the resultant signal light to the waveguide type optical multiplexing/demultiplexing unit 174 through an amplifier 103. The waveguide type optical multiplexing/demultiplexing unit 174 demultiplexes the output from the amplifier 103 in units of wavelengths, and outputs the wavelength division multiplex signal light having the wavelengths λ1 to λ4 to the optical transmission line B through the waveguide type optical multiplexing/demultiplexing unit 172. Similarly, the waveguide type optical multiplexing/demultiplexing unit 174 outputs the wavelength division multiplex signal light having the wavelengths λ5 to λ8 to the optical transmission line A through the waveguide type optical multiplexing/demultiplexing unit 171.

Figure 4:
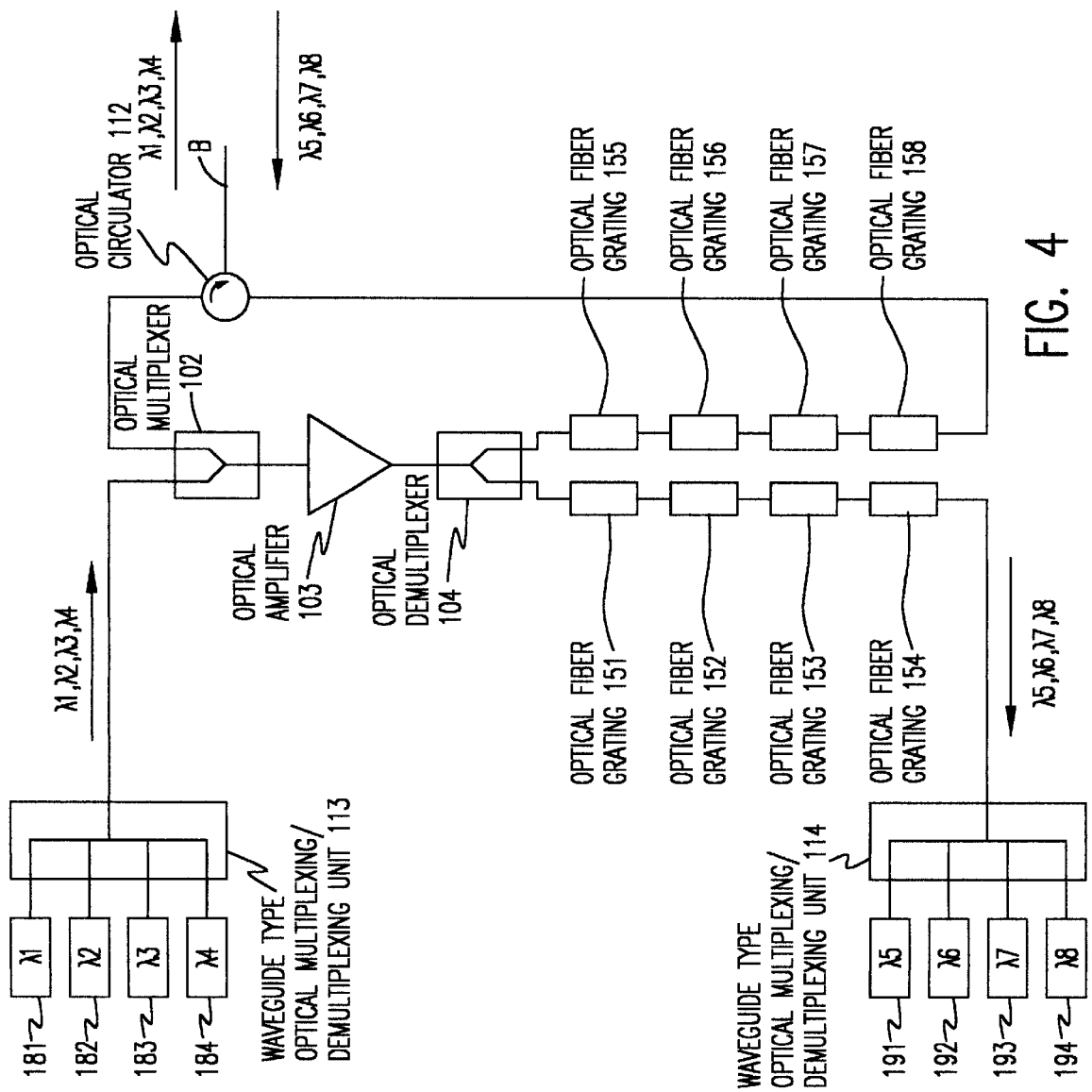
FIG. 4 is a block diagram showing a bidirectional wavelength division multiplex transmission apparatus according to the fourth embodiment of the present invention.
Figure 5:
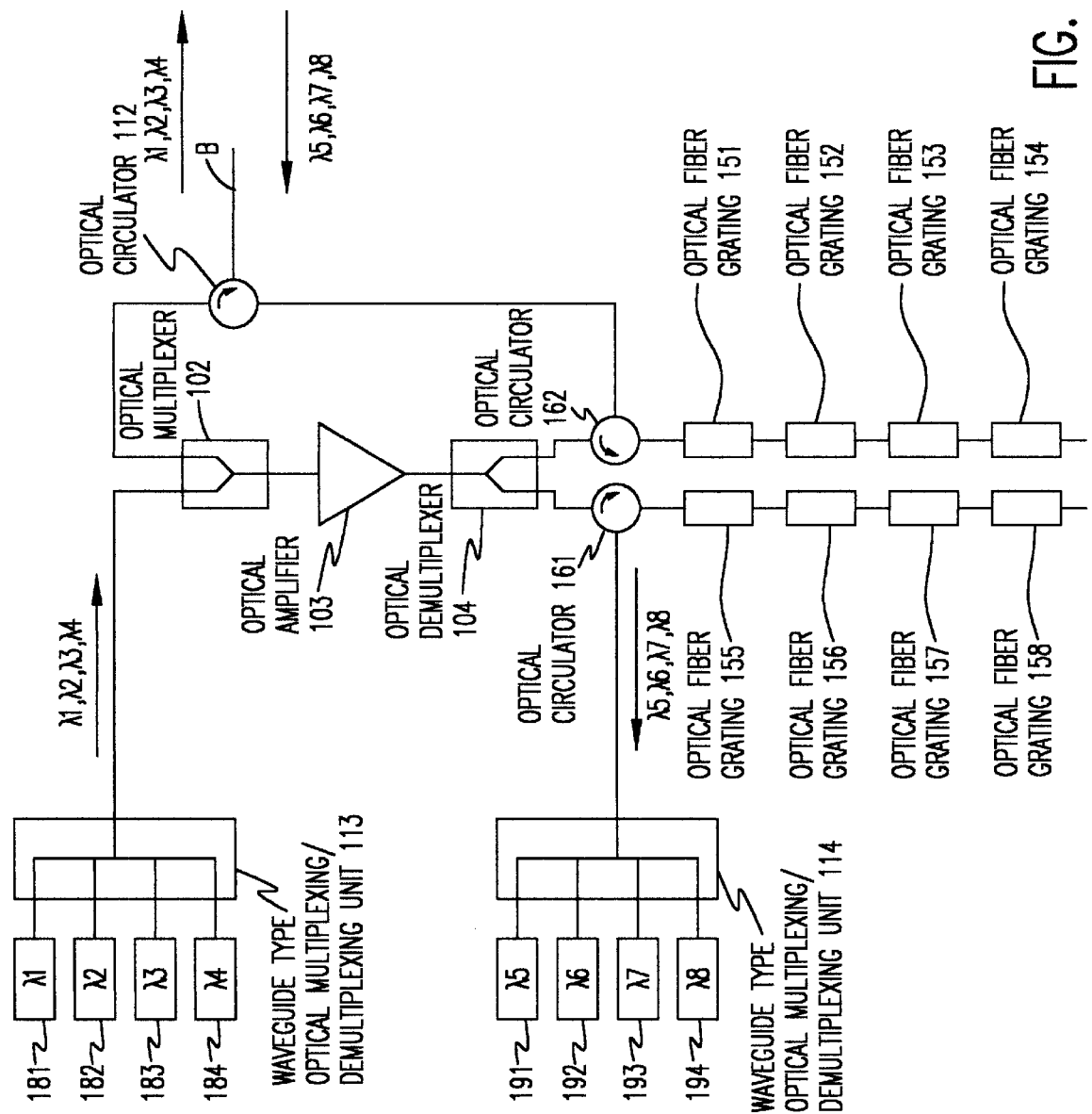
FIG. 5 is a block diagram showing a bidirectional wavelength division multiplex transmission apparatus according to the fifth embodiment of the present invention.
Figure 6:
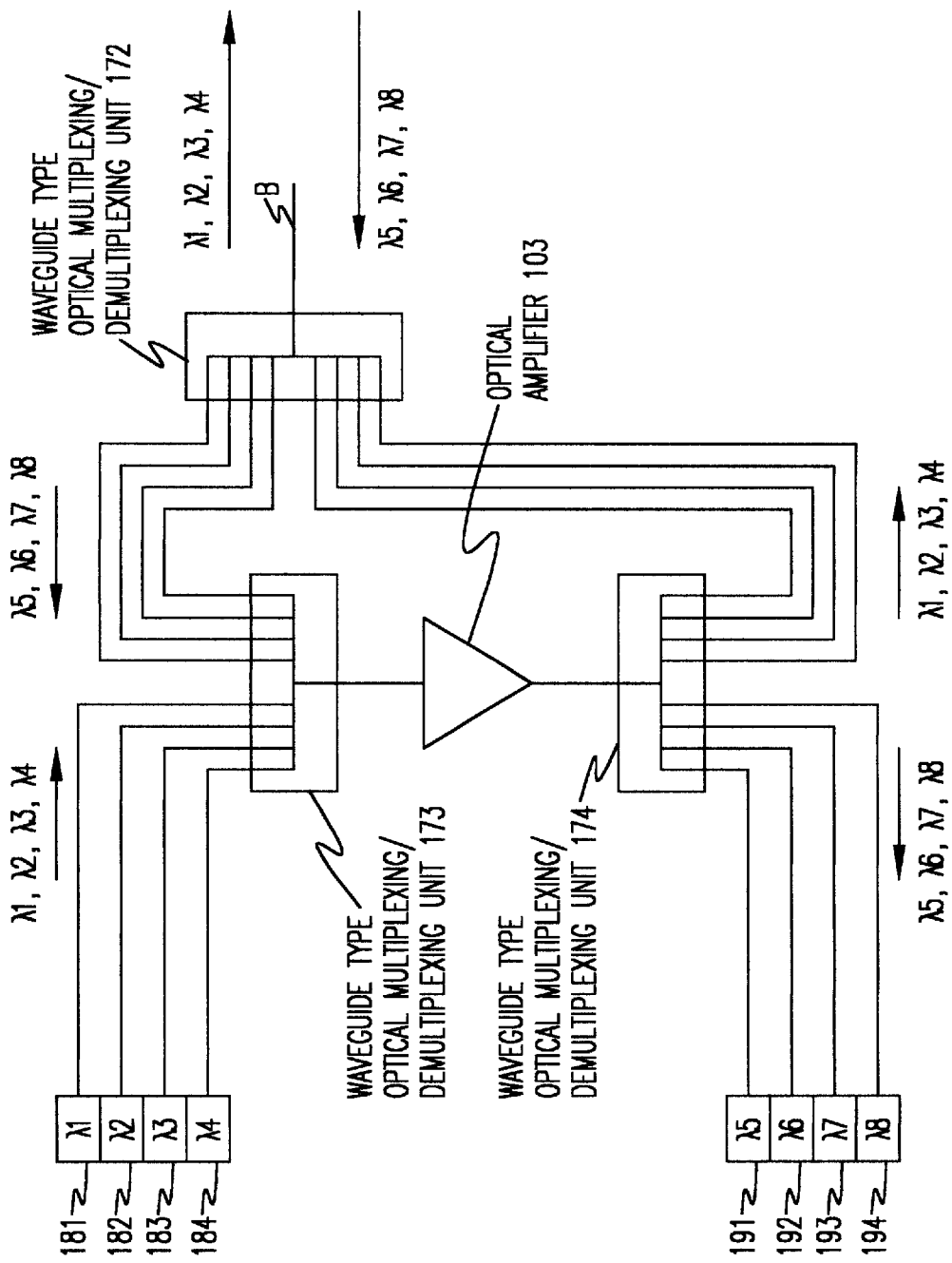
FIG. 6 is a block diagram showing a bidirectional wavelength division multiplex transmission apparatus according to the sixth embodiment of the present invention.
Figure 7:
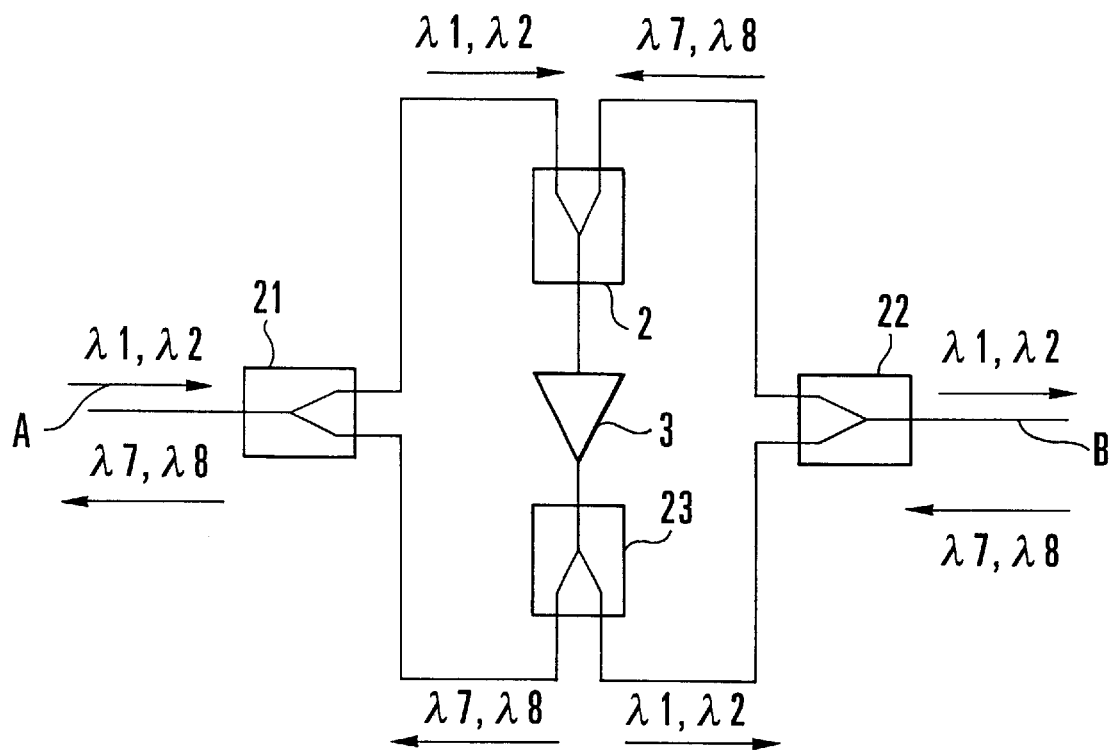
FIG. 7 is a block diagram showing a conventional bidirectional wavelength division multiplex transmission apparatus.
Figure 8:
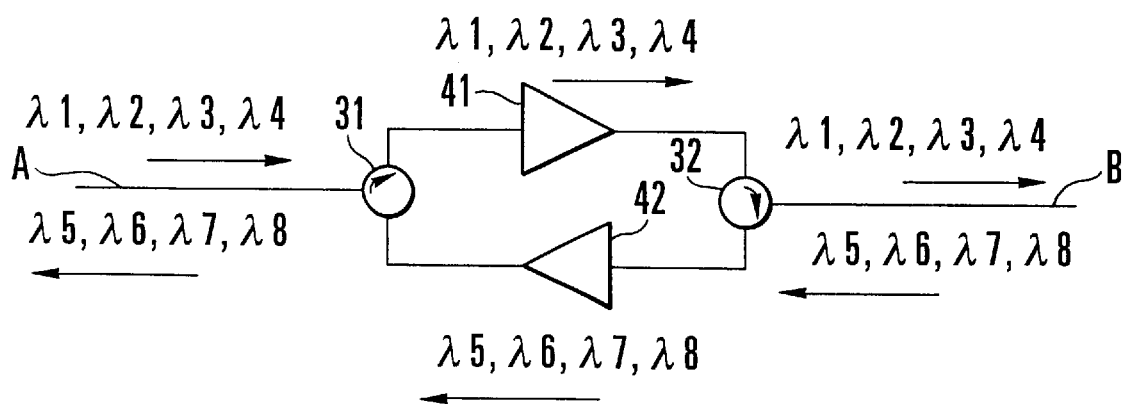
FIG. 8 is a block diagram showing another conventional bidirectional wavelength division multiplex transmission apparatus.
Figure 9:
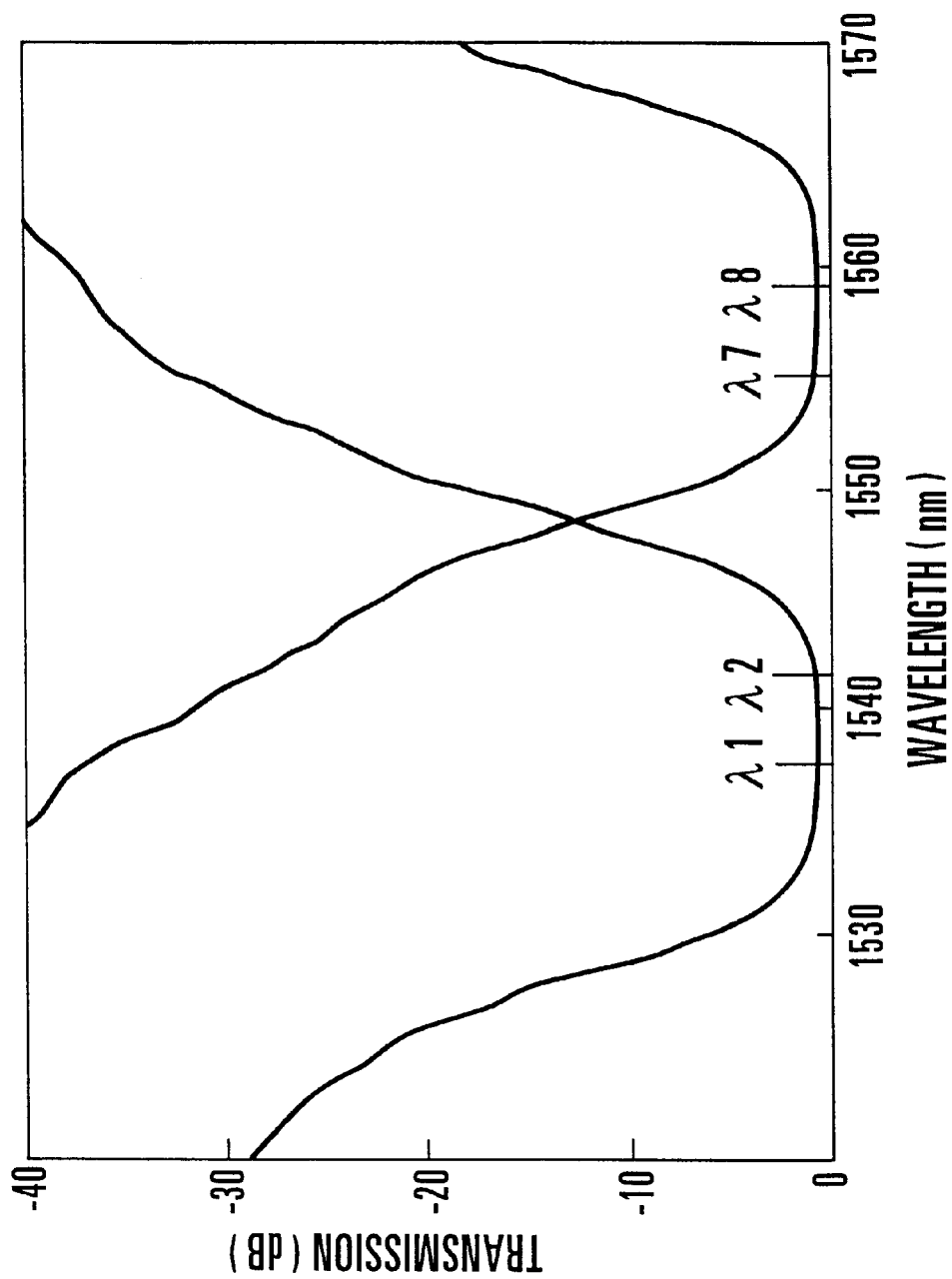
FIG. 9 is a graph showing how the number of wavelengths which can be multiplexed is limited in the conventional apparatus.

The first to third embodiments (FIGS. 1 to 3) described above exemplify optical inline amplifiers. The fourth to sixth embodiments (FIGS. 4 to 6) exemplify optical booster amplifiers/optical preamplifiers. FIGS. 4 to 6 correspond to FIGS. 1 to 3, and the same reference numerals denote the same parts throughout the drawings.

The fourth embodiment shown in FIG. 4 differs from the embodiment shown in FIG. 1 in that a transmission system constituted by a plurality of optical transmitters 181 to 184 and a waveguide type optical multiplexing/demultiplexing unit 113 serving as a multiplexing means and a reception system constituted by a waveguide type optical multiplexing/demultiplexing unit 114 serving as a demultiplexing means and a plurality of optical receivers 191 to 194 are separately arranged in place of the bidirectional optical transmission line A and the optical circulator 111. In this embodiment, the output terminal of the optical fiber grating 154 is connected to the waveguide type optical multiplexing/demultiplexing unit 114.

In the fifth embodiment shown in FIG. 5, as in the fourth embodiment in FIG. 4, a transmission system having a waveguide type optical multiplexing/demultiplexing unit 113 serving as a multiplexing means and a reception system having a waveguide type optical multiplexing/demultiplexing unit 114 serving as a demultiplexing means are separately arranged. In this embodiment, the output port of an optical circulator 161 is connected to the waveguide type optical multiplexing/demultiplexing unit 114.

The sixth embodiment shown in FIG. 6 differs from the embodiment shown in FIG. 3 in that the input ports, of a waveguide type optical multiplexing/demultiplexing unit 173, located on the optical transmission line A side are directly connected to optical transmitters 181 to 184, and the input ports, of a waveguide type optical multiplexing/demultiplexing unit 174, located on the optical transmission line A side are directly connected to the optical transmitters 181 to 184.

As has been described above, according to the bidirectional wavelength division multiplex transmission apparatus of the present invention, since narrow-band wavelength division multiplexing of signal light can be performed, the optical transmission lines can be effectively used, and an increase in transmission capacity can be attained.

In addition, since bidirectional wavelength division multiplex signal light beams can be amplified by one wavelength division multiplex optical amplifier altogether, the apparatus arrangement can be simplified, and the apparatus cost can be reduced. In addition, the maintenance of the apparatus is facilitated.

What is claimed is:

1. A bidirectional wavelength division multiplex transmission apparatus, comprising:

first optical branching/inserting means, connected to a first bidirectional optical transmission line, for branching/inserting optical signals;

second optical branching/inserting means, connected to a second bidirectional optical transmission line, for branching/inserting optical signals, said first branching/inserting means inserting a first group of optical signals of different wavelengths and said second branching/inserting means inserting a second group of optical signals of different wavelengths;

multiplexing means for performing wavelength division multiplexing of the optical signals output from said first and second branching/inserting means;

an optical amplifier for amplifying a wavelength division multiplex optical signal output from said multiplexing means; and demultiplexing means for demultiplexing the wavelength division multiplex optical signal amplified by said optical amplifier on a basis of wavelengths, and outputting the demultiplexed optical signal to one of the first and second optical transmission lines, wherein said demultiplexing means includes:
(a) an optical demultiplexer for demultplexing the optical signal from said optical amplifier into two optical signals, and
(b) optical filters for allowing optical signals, of the demultiplexed optical signals, which have specific wavelengths to pass therethrough, and outputting the signals to one of said first and second optical branching/inserting means, said optical filters outputting the optical signals in said first group to the second bidirectional optical transmission line and outputting the optical signals in said second group to the first bidirectional optical transmission line.

2. An apparatus according to claim 1, wherein said optical filters comprise a plurality of optical fiber gratings which are cascaded between output terminals of said optical demultiplexer and said first and second optical branching/inserting means and respectively have reflection characteristics corresponding to predetermined ones of said different wavelengths of the optical signals in said first and second groups.

3. An apparatus according to claim 2, wherein said optical filters are allocated between first and second sets of cascaded optical fiber gratings, with the first set connected to said first optical branching/inserting means and the second set connected to said second optical branching/inserting means.

4. An apparatus according to claim 3, wherein the first set of cascaded optical fiber gratings reflects the optical signals in said first group to prevent the optical signals in said first group from passing into said first optical branching/inserting means, and pass the optical signals in said second group to said first bidirectional transmission line through said first optical branching/inserting means, and
wherein the second set of cascaded optical fiber gratings reflect the optical signals in said second group to prevent the optical signals in said second group from passing into said second optical branching/inserting means, and pass the optical signals in said first group to said second bidirectional transmission line through said second optical branching/inserting means.

5. An apparatus according to claim 1, wherein said optical filters comprise:
a plurality of optical fiber gratings which are cascaded between output terminals of said optical demultiplexer and said first and second optical branching/inserting means and respectively have reflection characteristics corresponding to predetermined ones of said different wavelengths of the optical signals in said first and second groups; and
two optical circulators having input ports connected to the output terminals of said optical demultiplexer, output ports connected to said first optical branching/inserting means, and input/output ports connected to said cascaded optical fiber gratings.

6. An apparatus according to claim 5, wherein said optical filters are allocated between first and second sets of cascaded optical fiber gratings, with the first set connected to the optical circulator whose input/output port is connected to said first optical branching/inserting means and the second set connected to the optical circulator whose input/output port is connected to said second optical branching/inserting means.

7. An apparatus according to claim 6, wherein the fist set of cascaded optical fiber gratings passes the optical signals in said first group to a reflectionless terminal to prevent the optical signals in said first group from being transmitted into said firs optical branching/inserting means, and reflects the optical signals in said second group to said first optical branching/inserting means, and
wherein the second set of cascaded optical fiber gratings passes the optical signals in said second group to a reflectionless terminal to prevent the optical signals in said second group from passing into said second optical branching/inserting means, and reflects the optical signals in said first group to said second optical branching/inserting means.

8. An apparatus according to claim 1, wherein said first and second optical branching/inserting means comprise optical circulators having input ports connected to output terminals of said demultiplexing means, output ports connected to input terminals of said optical multiplexing means, and input/output ports respectively connected to the first and second optical transmission lines.

9. An apparatus according to claim 1, wherein said first optical branching/inserting means and said second optical branching/inserting means are optical circulators.

10. An apparatus according to claim 1, wherein said optical amplifier is the only optical amplifier in said apparatus.

11. A bidirectional wavelength division multiplex transmission apparatus, comprising:
optical branching/inserting means, connected to a bidirectional optical transmission line, for branching/inserting optical signals;
a transmission system which transmits a wavelength division multiplex optical signal, said transmission system transmitting a first group of optical signals of different wavelengths and optical branching/inserting means inserting a second group of optical signals of different wavelengths;
a reception system which receives a wavelength division multiplex optical signal;
multiplexing means for performing wavelength division multiplexing of optical signals output from said optical branching/inserting means and said transmission system;
an optical amplifier for amplifying a wavelength division multiplex optical signal output from said multiplexing means; and
demultiplexing means for demultiplexing the wavelength division multiplex signal amplified by said optical amplifier on a basis of the wavelengths, and outputting the demultiplexed optical signal to one of said optical transmission line and said reception system, wherein said demultiplexing means includes:
(a) an optical demultiplexer for demultiplexing the optical signal from said optical amplifier into two optical signals, and
(b) optical filters for allowing optical signals, of the demultiplexed optical signals, which have specific wavelengths to pass therethrough, and outputting the signals to one of said optical branching/inserting means and said reception system, said optical filters outputting the optical signals in said first group to said bidirectional optical transmission line and outputting the optical signals in said second group to said reception system.

12. An apparatus according to claim 11, wherein said optical filters comprise a plurality of optical fiber gratings which are cascaded between output terminals of said optical demultiplexer and each of said optical branching/inserting means and said reception system, and respectively have reflection characteristics corresponding to predetermined ones of said different wavelengths of the optical signals in said first and second groups.

13. An apparatus according to claim 12, wherein said optical filters are allocated between first and second sets of cascaded optical fiber gratings, with the first set connected to the reception system and the second set connected to said optical branching/inserting means.

14. An apparatus according to claim 13, wherein the first set of cascaded optical fiber gratings reflect the optical signals in said first group and pass the optical signals in said second group to said reception system, and wherein the second set of cascaded optical fiber gratings reflect the optical signals in said second group and pass the optical signals in said first group to said optical branching/inserting means.

15. An apparatus according to claim 11, wherein said optical filters comprise:

a plurality of optical fiber gratings which are cascaded between output terminals of said optical demultiplexer and each of said optical branching/inserting means and said reception system, and respectively have reflection characteristics corresponding to predetermined ones of said different wavelengths of the optical signals in said first and second groups; and two optical circulators having input ports connected to the output terminals of said optical demultiplexer, output ports connected to said first optical branching/inserting means, and input/output ports connected to said cascaded optical fiber gratings.

16. An apparatus according to claim 15, wherein said optical filters are allocated between first and second sets of cascaded optical fiber gratings, with the first set connected to the optical circulator whose input/output port is connected to said reception system and the second set connected to the optical circulator whose input/output port is connected to said optical branching/inserting means.

17. An apparatus according to claim 16, wherein the first set of cascaded optical fiber gratings passes the optical signals in said first group to a reflectionless termination and reflects the optical signals in said second group to said reception system, and wherein the second set of cascaded optical fiber gratings passes the optical signals in said second group to a reflectionless termination and reflects the optical signals in said first group to said optical branching/ inserting means.

18. An apparatus according to claim 11, wherein said optical branching/inserting means comprises an optical circulator having an input port connected to an output terminal of said demultiplexing means, an output port connected to an input terminal of said optical multiplexing means, and an input/output port connected to said optical transmission line.

* * * * *